United States Patent [19]

Baumgartner et al.

[11] Patent Number: 5,642,171
[45] Date of Patent: Jun. 24, 1997

[54] METHOD AND APPARATUS FOR SYNCHRONIZING AUDIO AND VIDEO DATA STREAMS IN A MULTIMEDIA SYSTEM

[75] Inventors: Donn M. Baumgartner; Thomas A. Dye, both of Austin, Tex.

[73] Assignee: Dell USA, L.P., Round Rock, Tex.

[21] Appl. No.: 255,604

[22] Filed: Jun. 8, 1994

[51] Int. Cl.⁶ .................................................. H04N 5/04
[52] U.S. Cl. .......................................... 348/515; 395/806
[58] Field of Search ............................ 348/515; 395/154, 395/162–164; 345/122; 375/355; H04N 5/04, 5/12

[56] References Cited

U.S. PATENT DOCUMENTS

| Re. 33,535 | 2/1991 | Cooper. | |
|---|---|---|---|
| 4,538,176 | 8/1985 | Haji et al. | |
| 4,618,890 | 10/1986 | Kouyama et al. | |
| 4,644,400 | 2/1987 | Kouyama et al. | |
| 4,679,085 | 7/1987 | Chapelle et al. | |
| 4,703,355 | 10/1987 | Cooper. | |
| 4,750,034 | 6/1988 | Lem. | |
| 4,851,909 | 7/1989 | Noske et al. | |
| 5,170,252 | 12/1992 | Gear et al. | |
| 5,420,801 | 5/1995 | Dockter et al. | 364/514 R |
| 5,430,485 | 7/1995 | Lankford et al. | 348/515 |
| 5,471,576 | 11/1995 | Yee | 395/154 |

FOREIGN PATENT DOCUMENTS 2305278 12/1990 Japan ............................... 348/515

OTHER PUBLICATIONS

Nicolaou, Cosmos "An Architecture for Real-Time Multimedia Communication Systems"; IEEE Journal on Selected Areas in Communications, vol. 8, No. 3, Apr. 1990.

Little, Thomas D.C. and Arif Ghafoor "Synchronization and Storage Models for Multimedia Objects"; IEEE Journal on Selected Areas in Communications, vol. 8, No. 3, Apr. 1990.

*Primary Examiner*—Sherrie Hsia

[57] ABSTRACT

A method and apparatus for synchronizing audio and video data streams in a computer system during a multimedia presentation to produce a correctly synchronized presentation. The preferred embodiment of the invention utilizes a nonlinear feedback method for data synchronization. The method of the present invention periodically queries each driver for the current audio and video position (or frame number) and calculates the synchronization error. The synchronization error is used to determine a tempo value adjustment to one of the data stream designed to place the video and audio back in sync. The method then adjusts the audio or video tempo to maintain the audio and video data streams in synchrony. In the preferred embodiment of the invention, the video tempo is changed nonlinearly over time to achieve a match between the video position and the equivalent audio position. The method applies a smoothing function to the determined tempo value to prevent overcompensation. The method of the present invention can operate in any hardware system and in any software environment and can be adapted to existing systems with only minor modifications.

40 Claims, 7 Drawing Sheets

METHOD AND APPARATUS FOR SYNCHRONIZING AUDIO AND VIDEO DATA STREAMS IN A MULTIMEDIA SYSTEM

FIELD OF THE INVENTION

The present invention relates generally to multimedia computer systems, and more particularly to a method and apparatus for synchronizing video and audio data streams in a computer system during a multimedia presentation.

DESCRIPTION OF THE RELATED ART

Multimedia computer systems have become increasingly popular over the last several years due to their versatility and their interactive presentation style. A multimedia computer system can be defined as a computer system having a combination of video and audio outputs for presentation of audio-visual displays. A modem multimedia computer system typically includes one or more storage devices such as an optical drive, a CD-ROM, a hard drive, a videodisc, or an audiodisc, and audio and video data are typically stored on one or more of these mass storage devices. In some file formats the audio and video are interleaved together in a single file, while in other formats the audio and video data are stored in different files, many times on different storage media. Audio and video data for a multimedia display may also be stored in separate computer systems that are networked together. In this instance, the computer system presenting the multimedia display would receive a portion of the necessary data from the other computer system via the network cabling.

A multimedia computer system also includes a video card such as a VGA (Video Graphics Array) card which provides output to a video monitor, and a sound card which provides audio output to speakers. A multimedia computer system may also include a video accelerator card or other specialized video processing card for performing video functions, such as compression, decompression, etc. When a computer system displays a multimedia presentation, the computer system microprocessor reads the audio and video data stored on the respective mass storage devices, or received from the other computer system in a distributed system, and provides the audio stream through the sound card to the speakers and provides the video stream through the VGA card and any specialized video processing hardware to the computer video monitor. Therefore, when a computer system presents an audio-visual display, the audio data stream is decoupled from the video data stream, and the audio and video data streams are processed by separate hardware subsystems.

A multimedia computer system also includes an operating system and drivers for controlling the various hardware elements used to create the multimedia display. For example, a multimedia computer includes an audio driver or sound card driver for controlling the sound card and a video driver for controlling the optional video processing card. One example of an operating system which supports multimedia presentations is the Multimedia Extensions for the Microsoft Windows operating system.

Graphic images used in Windows multimedia applications can be created in either of two ways, these being bit-mapped images and vector-based images. Bit-mapped images comprise a plurality of picture elements (pixels) and are created by assigning a color to each pixel inside the image boundary. Most bit-mapped color images require one byte per pixel for storage, so large bit-mapped images create correspondingly large files. For example, a full-screen, 256-color image in 640-by-480-pixel VGA mode requires 307,200 bytes of storage, if the data is not compressed. Vector-based images are created by defining the end points, thickness, color, pattern and curvature of lines and solid objects comprised within the image. Thus, a vector-based image includes a definition which consists of a numerical representation of the coordinates of the object, referenced to a corner of the image.

Bit-mapped images are the most prevalent type of image storage format, and the most common bit-mapped-image file formats are as follows. A file format referred to as BMP is used for Windows bit-map files in 1-, 2-, 4-, 8-, and 24-bit color depths. BMP files contain a bit-map header that defines the size of the image, the number of color planes, the type of compression used (if any), and the palette used. The Windows DIB (device-independent bit-map) format is a variant of the BMP format that includes a color table defining the RGB (red green blue) values of the colors used. Other types of bit-map formats include the TIF (tagged image format file), the PCX (Zsoft Personal Computer Paintbrush Bitmap) file format, the GIF (graphics interchange file) format, and the TGA (Texas Instruments Graphic Architecture) file format.

The standard Windows format for bit-mapped images is a 256-color device-independent bit map (DIB) with a BMP (the Windows bit-mapped file format) or sometimes a DIB extension. The standard Windows format for vector-based images is referred to as WMF (Windows meta file).

Compression

Full-motion video implies that video images shown on the computer's screen simulate those of a television set with identical (30 frames-per-second) frame rates, and that these images are accompanied by high-quality stereo sound. A large amount of storage is required for high-resolution color images, not to mention a full-motion video sequence. For example, a single frame of NTSC video at 640-by-400-pixel resolution with 16-bit color requires 512K of data per frame. At 30 flames per second, over 15 Megabytes of data storage are required for each second of full motion video. Due to the large amount of storage required for full motion video, various types of video compression algorithms are used to reduce the amount of necessary storage. Video compression can be performed either in real-time, i.e., on the fly during video capture, or on the stored video file after the video data has been captured and stored on the media. In addition, different video compression methods exist for still graphic images and for full-motion video.

Examples of video data compression for still graphic images are RLE (run-length encoding) and JPEG (Joint Photographic Experts Group) compression. RLE is the standard compression method for Windows BMP and DIB files. The RLE compression method operates by testing for duplicated pixels in a single line of the bit map and stores the number of consecutive duplicate pixels rather than the data for the pixel itself. JPEG compression is a group of related standards that provide either lossless (no image quality degradation) or lossy (imperceptible to severe degradation) compression types. Although JPEG compression was designed for the compression of still images rather than video, several manufacturers supply JPEG compression adapter cards for motion video applications.

In contrast to compression algorithms for still images, most video compression algorithms are designed to compress full motion video. Video compression algorithms for motion video generally use a concept referred to as interframe compression, which involves storing only the differences between successive frames in the data file. Interframe compression begins by digitizing the entire image of a key frame. Successive frames are compared with the key frame, and only the differences between the digitized data from the key frame and from the successive frames are stored. Periodically, such as when new scenes are displayed, new key frames are digitized and stored, and subsequent comparisons begin from this new reference point. It is noted that interframe compression ratios are content-dependent, i.e., if the video clip being compressed includes many abrupt scene transitions from one image to another, the compression is less efficient. Examples of video compression which use an interframe compression technique are MPEG, DVI and Indeo, among others.

MPEG (Moving Pictures Experts Group) compression is a set of methods for compression and decompression of full motion video images that uses the interframe compression technique described above. The MPEG standard requires that sound be recorded simultaneously with the video data, and the video and audio data are interleaved in a single file to attempt to maintain the video and audio synchronized during playback. The audio data is typically compressed as well, and the MPEG standard specifies an audio compression method referred to as ADPCM (Adaptive Differential Pulse Code Modulation) for audio data.

A standard referred to as Digital Video Interactive (DVI) format developed by Intel Corporation is a compression and storage format for full-motion video and high-fidelity audio data. The DVI standard uses interframe compression techniques similar to that of the MPEG standard and uses ADPCM compression for audio data. The compression method used in DVI is referred to as RTV 2.0 (real time video), and this compression method is incorporated into Intel's AVK (audio/video kernel) software for its DVI product line. IBM has adopted DVI as the standard for displaying video for its Ultimedia product line. The DVI file format is based on the Intel i750 chipset and is supported through the Media Control Interface (MCI) for Windows. Microsoft and Intel jointly announced the creation of the DV MCI (digital video media control interface) command set for Windows 3.1 in 1992.

The Microsoft Audio Video Interleaved (AVI) format is a special compressed file structure format designed to enable video images and synchronized sound stored on CD-ROMs to be played on PCs with standard VGA displays and audio adapter cards. The AVI compression method uses an interframe method, i.e., the differences between successive frames are stored in a manner similar to the compression methods used in DVI and MPEG. The AVI format uses symmetrical software compression-decompression techniques, i.e., both compression and decompression are performed in real time. Thus AVI files can be created by recording video images and sound in AVI format from a VCR or television broadcast in real time, if enough free hard disk space is available.

In the AVI format, data is organized so that coded frame numbers are located in the middle of an encoded data file containing the compressed audio and compressed video. The digitized audio and video data are organized into a series of frames, each having header information. Each frame of the audio and video data streams is tagged with a frame number that typically depends upon the frame rate. For example, at every 33 milliseconds (ms) or a 30th of a second, a frame number is embedded in the header of the video frame and at every 30th of a second, or 33 ms, the same frame number is embedded in the header of the audio track. The number assigned to the frames is, therefore, coordinated so that the corresponding audio and video frames are originally tagged with the same number. Therefore, since the frames are initially received simultaneously, the frames can actually be preprocessed so that tag codes are placed into the header files of the audio and the video for tracking the frame number and position of the audio and video tracks.

In the AVI format, the audio and video information are interleaved (alternated in blocks) in the CD-ROM to minimize delays that would result from using separate tracks for video and audio information. Also, the audio and video data are interleaved to synchronize the data as it is stored on the system. This is done in an attempt to synchronize the audio and video data during playback.

The Apple QuickTime format was developed by Apple for displaying animation and video on Macintosh computers, and has become a de facto multimedia standard. Apple's QuickTime and Microsoft's AVI take a parallel approach to the presentation of video stored on CD-ROMs, and the performance of the two systems is similar. The QuickTime format, like AVI, uses software compression and decompression techniques but also can employ hardware devices, similar to those employed by DVI, to speed processing. The Apple QuickTime format became available for the PC under Microsoft Windows in late 1992.

As mentioned above, the audio and video data streams in a multimedia presentation are processed by separate hardware subsystems under the control of separate device drivers. The audio and video data are separated into separate data streams that are then transmitted to separate audio and video subsystems. The video data is transmitted to the video subsystem for display, and the audio data is transmitted to the sound subsystem for broadcast. These two subsystems are addressed by separate drivers, and each driver is loaded dynamically by the operating system during a multimedia presentation. In an operating system that is multi-tasking, has multiple drivers, or has multiple windows, the time period between the servicing of drivers is indeterminate. If a driver is not serviced by the operating system in time for the next frame, a portion of the multimedia systems may stall, resulting in the audio not being synchronized with the video. When the audio and video portions of a multimedia presentation become unsynchronized, many times this lack of synchronization is noticeable to the viewer, resulting in a less pleasing display. One result of audio and video data being out of sync is that the viewer may hear words that do not match the lips of the speaker, a situation commonly called "out of lip sync."

Therefore, many times the corresponding audio and video frames of a multimedia presentation are not played synchronously together. The reasons for the audio and video data streams falling out of sync during a presentation include the inherent decoupling of the audio and video data streams in separate subsystems in conjunction with system bottlenecks and performance issues associated with the large amounts of data that are required to be manipulated during a multimedia presentation. As mentioned above, full motion video clips with corresponding audio require massive amounts of system resources to process. However, a considerably greater amount of processing is required to display the video data than is required for the audio data. First the video data must be decompressed either in software or in a codec (compression-decompression) device. If the color depth of the video is higher than that of the display, such as when an AVI file with 16 bit video is played on an 8 bit display, the computer must dither colors to fit within the display's color restrictions. Also, if the selected playback window size is inconsistent with the resolution at which the video was captured, the computer is required to scale each frame.

In addition to the greater amount of processing required for video data, the amount of video processing can vary considerably, thus further adversely affecting synchronization. For example, one variable that affects the speed of video playback is the decompression performed on the video data. The performance of software decompression algorithms can vary for a number of reasons. For example, due to the interframe method of compressing data, the number of bytes that comprise each video frame is variable, depending on how similar the prior video frame is to the current video frame. Thus, more time is required to process a series of frames in which background is moving than is required to process a series of frames containing only minor changes in the foreground. Other variables include whether the color depth of the video equals that of the display and whether the selected playback window size is consistent with the resolution at which the video was captured, as mentioned above.

In addition, a slow CPU adversely affects every stage in the processing of a video file for playback. A sluggish hard disk or CD-ROM controller can also adversely affect performance as can the performance of the display controller or video card. Also, other demands can be made on the system as a result of something as simple as a mouse movement. While the above processing is being performed on the video and audio data, and while other demands are made on system resources, it becomes very difficult to ensure that the audio and video data remain in synchronization.

Video for Windows includes a method which presumably attempts to maintain the audio and video portions of a multimedia display in sync, i.e., attempts to adapt when the computer system cannot keep up with either the video or audio portions of the display. Video for Windows benchmarks the video hardware when it first begins execution as well as every time thereafter that the default display is changed. The results of these tests are used to determine a particular system's baseline display performance at various resolutions and color depths. Video for Windows then uses this information regarding the capabilities of the video system to adjust the video frame rate to match the benchmarked performance for the default display. Video for Windows maintains the continuity of the audio at all costs because a halting audio track is deemed more distracting. When the burden of the video playback is such that the system cannot keep up, Video for Windows skips frames during playback or adjusts the frame rate continuously as the system's resource usage patterns change.

However, the method used by video for Windows in adjusting the video rate to match the benchmarked performance of the default display results in an average frame rate suitable for the benchmark determined at the time the default was last changed. Attempts to display video frames containing an unusually heavy amount of non-repetitive data will slow processing down to the point where the benchmarked frame rate is no longer useful. When this happens, video frames are skipped because the burden of processing the video data becomes too great to preserve lip-sync in the display. The result can be "jerky" movement of the images of persons speaking as noted in *Discover Windows 3.1 Multimedia*, by Roger Jennings (Que Corp. 1992), p. 105–106. Thus, the method used by Video for Windows has proven to be inadequate, i.e., the video and audio portions still fall out of sync or exhibit "jerky" movement during a presentation.

Shortcomings inherent in decoupled audio multimedia systems have been a problem for some time, and various efforts have been made to synchronize the audio and video portions of a presentation. There has been a recognized need in the industry for a solution to this problem. However, no satisfactory solution has been found, prior to the present invention.

Therefore, a method and apparatus is desired which provides improved synchronization between digital audio and digital video data streams in a multimedia computer system, i.e., a method is needed to assure that corresponding video and audio frames are played back together. A synchronization method is also desired that does not require the use of an encoding procedure prior to the processing of audio and video digital signals. It is also desirable to provide a multimedia synchronization system that is capable of functioning consistently whether video and audio data are delivered to the system in separate files or interleaved in one file.

SUMMARY OF THE INVENTION

The present invention comprises a method and apparatus for synchronizing separate audio and video data streams in a multimedia system. The preferred embodiment of the invention utilizes a nonlinear feedback method for data synchronization that is independent of hardware, the operating system and the video and audio drivers used. The system and method of the present invention does not require that incoming data be time stamped, or that any timing information exist in the video data stream relative to audio and video data correspondence. Further, the data is not required to be modified in any way prior to the transfer of data to the video and audio drivers, and no synchronization information need be present in the separated audio and video data streams that are being synchronized by the system and method of the present invention. The preferred embodiment of the present invention requires that there be a common starting point for the audio and video data, i.e., that them be a time index of zero where the audio and video are both in synchrony, such that the first byte of audio and video digital data are generated simultaneously.

The synchronization method of the present invention is called periodically during a multimedia display to synchronize the video and audio data streams. In the preferred embodiment, a periodic timer is set to interrupt the multimedia operating system at uniform intervals during a multimedia display and direct the operating system to invoke the synchronization method of the present invention. When the synchronization method is invoked, the method first queries the video driver to determine the current video frame position and then queries the audio driver to determine the current audio position. The current audio position is then used to compute the equivalent audio frame number. The synchronization method compares the video and audio frame positions and computes a synchronization error value, which is essentially the number of frames by which the video frame position is in front of or behind the current audio frame position.

The synchronization error is used to assign a tempo value meaningful to either the video driver or the audio driver. In the preferred embodiment, the method adjusts the video tempo to maintain video synchronization, but in an alternate embodiment the method adjusts the audio tempo to maintain synchronization. Once a video tempo value has been determined, the preferred method adjusts this video tempo value by applying a smoothing function, i.e., a weighted average of prior tempo values, to the determined tempo value. If the synchronization error is determined to be greater than a defined tolerance, i.e., if the audio and video data streams are more than a certain number of flames out of sync, and if the tempo value is not equal to the last tempo value previously sent to the video driver, then the method adjusts the video frame speed by passing the tempo value to the video driver.

If the synchronization error is approximately 0, i.e., the audio and video data streams are substantially in sync, and the prior determined tempo value passed to the video driver was not the nominal rate, i.e., the rate intended to exactly match the audio rate, the method passes a video tempo value at the nominal rate to the video driver. In other words, if the audio and video data streams are in sync, a tempo value at the nominal rate is passed to the video driver. This removes any affects of the smoothing function, which otherwise would change the tempo value to other than the nominal rate.

The method also determines if the audio is too far ahead of the video and if the audio is playing. If so, the audio is paused to allow the video to catch up. If the method determines that the audio is paused and that the video has caught up, the method restarts the audio. The method saves the video tempo value for comparison during the next call by the periodic timer and surrenders control to the operating system until called again.

Therefore, the present invention provides an improved method of synchronizing the audio and video data streams during a multimedia presentation to provide a correctly synchronized presentation. The present invention permits the use of existing software drivers and multimedia operating systems. Further, the method of the present invention operates independently of where the audio and video data are stored as well as the type of operating system or drivers being used. Thus the present invention operates regardless of whether the audio and video data are interleaved in one file, stored on different media, or stored in separate computer systems. Also, the present invention does not require any type of time stamping or tagging of data, and thus does not require any modification of the video or audio data. Further, the present invention operates regardless of the type of compression/decompression algorithm used on the video data.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Multimedia Computer System

Figure 1:
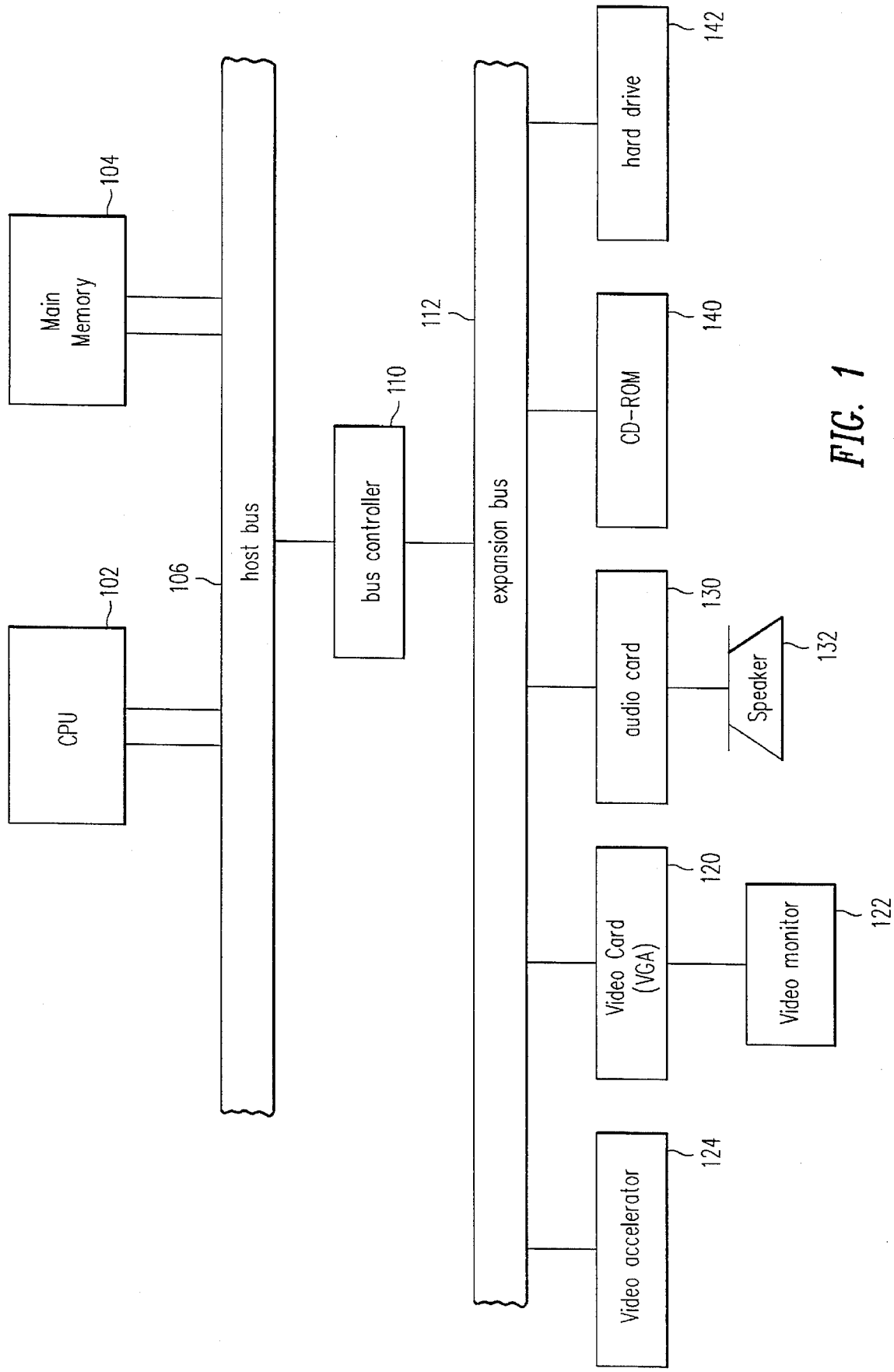
FIG. 1 illustrates a block diagram of a multimedia computer system according to one embodiment of the invention.

Referring now to FIG. 1, a block diagram illustrating a multimedia computer system according to one embodiment of the present invention is shown. It is noted that FIG. 1 illustrates only portions of a functioning computer system, and those elements not necessary to the understanding of the operation of the present invention have been omitted for simplicity. As shown, the multimedia computer system includes a CPU 102 coupled to a host bus 106. Main memory 104 is also coupled to the host bus 106. The host bus 106 is coupled to an expansion bus 112 by means of a bus controller 110. The expansion bus may be any of various types including the AT (advanced technology) bus or industry standard architecture (ISA) bus, the EISA (extended industry standard architecture) bus, a microchannel (MCA) bus, etc. A video card or video adapter such as a VGA (video graphics array) card 120 is coupled to the expansion bus 112 and is adapted to interface to a video monitor 122, as shown. The computer system may also include a video accelerator card 124 for performing compression/decompression (codec) functions. However, in the preferred embodiment the computer system does not include a video accelerator card. An audio card or sound card 130 is also coupled to the expansion bus 112 and interfaces to a speaker 132. The audio board 130 is preferentially a Sound Blaster II brand card made by Creative Labs, Inc. of Milpitas, Calif.

Various mass storage devices are also coupled to the expansion bus 112, preferably including a CD-ROM 140, and a hard drive 142, as well as others. One or more of these mass storage devices store video and audio data which is used during presentation of a multimedia display. The audio and video data may be stored in any of a number of formats and may be stored on different media. Further, the audio and video data may be stored on media located in other computer systems that are connected to the computer system via a network. Thus the present invention can operate in a distributed environment.

It is noted that a multimedia computer system according to the present invention may be configured in any of a number of ways. For example, the video and audio card 120 and 130, as well as one or more of the mass storage devices 140 or 142 may be coupled to a CPU local bus such as the PCI (peripheral compact interconnect) bus, or the VESA (Video Enhanced Standards Association) local bus, as desired. Various other computer configurations are also contemplated, such as a distributed system.

In the preferred embodiment of the invention, the multimedia computer system illustrated in FIG. 1 operates using the Windows 3.1 Operating System from Microsoft Corporation of Redmond, Washington. The computer system also preferably includes the Microsoft Windows multimedia extension software, including Microsoft's Media Control Interface and associated drivers. The Windows Media Control Interface (MCI) is a set of high-level commands that provide a device-independent interface for controlling multimedia devices and media files. The MCI command set is designed to provide a generic core set of commands to control different types of media devices. Because of the high level of device independence provided by the MCI command set, a programmer can use MCI commands rather than a low level API to access the multimedia capabilities of Windows. It is noted that the computer system may use other operating systems and other multimedia software, as desired.

The computer system includes video and audio drivers which interface to video and audio hardware, respectively. The audio driver interfaces between the multimedia operating system and the audio card 130. The video driver interfaces between the operating system and the video accelerator card, if any. In the preferred embodiment, which does not include a video accelerator 124, the video driver does not actually interface to any video hardware, but rather performs various video data processing on the main CPU 102. In the preferred embodiment, the video driver is comprised in the Intel Audio-Visual Kernel (AVK). The audio driver is preferably an MCI compliant WAV driver corresponding to the respective audio card 130.

The computer system also includes a synchronization method according to the present invention which synchronizes the audio and video data streams during a multimedia presentation to ensure that the appropriate sounds are generated by the speaker 132 when the corresponding images are being displayed by the video monitor 122.

Multimedia Software Architecture of the Preferred Embodiment

Figure 2:
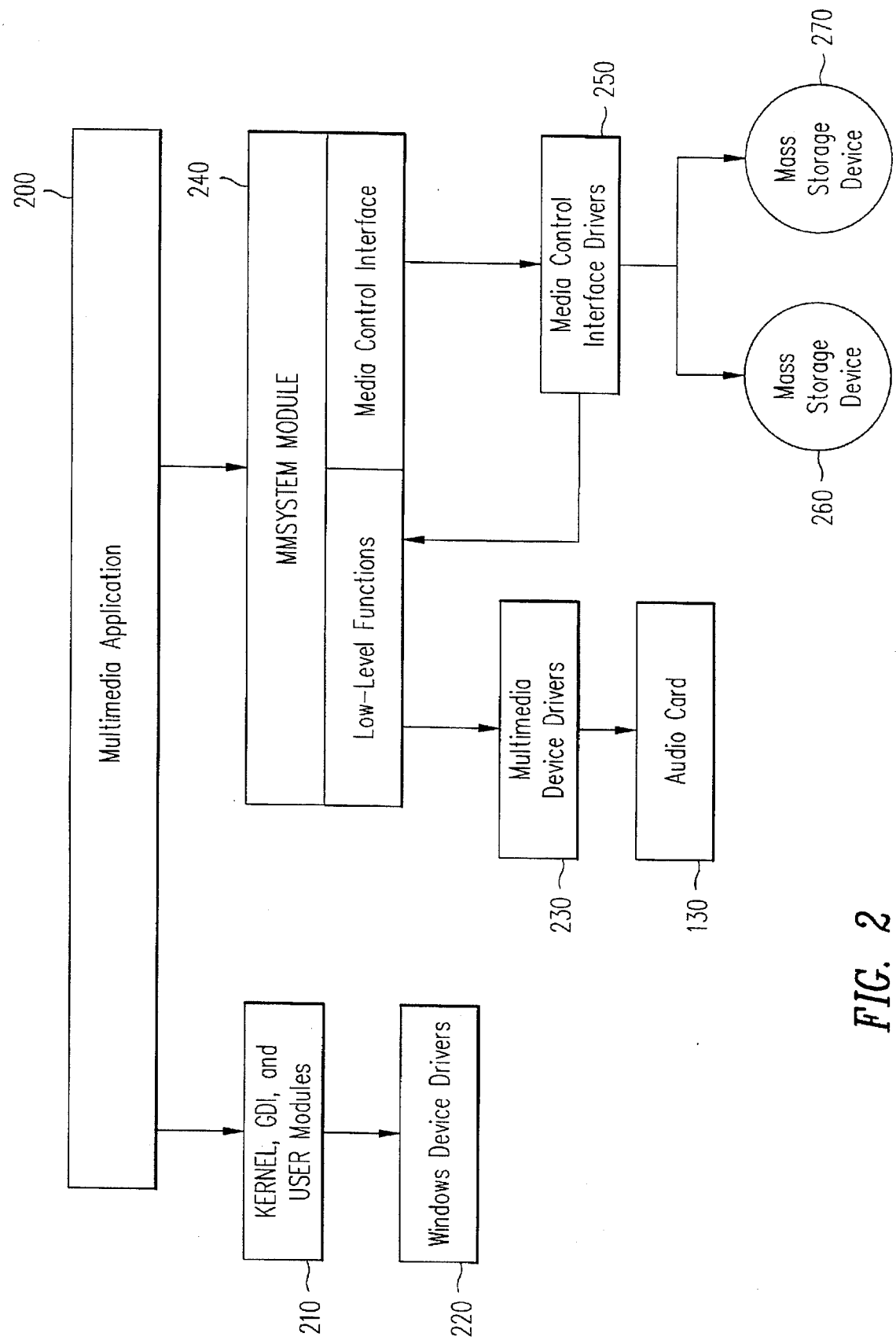
FIG. 2 is a block diagram illustrating a typical multimedia control system.

Referring now to FIG. 2, the Microsoft Windows' Multimedia Extensions Software Architecture is illustrated. As shown in FIG. 2, a multimedia application 200 directs a computer system to present a multimedia display by interfacing to the hardware through the operating system and various device driver layers. The block 210 includes the Windows Kernel and Graphics Device Interface (GDI), i.e., the bulk of the Windows operating system. As shown, the multimedia application 200 interfaces through the Windows operating system 210 to Windows device drivers 220. The device drivers 220 interface to the various elements in the computer system including the printer, hard drive 142, video monitor 122, etc.

The block 240 comprises the Windows Multimedia Extensions Software. This translation layer isolates applications from device drivers and centralizes device-independent code. The translation layer 240 translates a multimedia function call into a set of Media Control Interface ("MCI") calls which interface to Media Control Interface drivers 250. As shown, the Media Control Interface drivers interface to mass storage devices 260 and 270 such as the CD-ROM 140 or hard drive 142. The Media Control Interface layer also communicates with MCI compliant multimedia device drivers 230 using a set of low level functions, as shown. The multimedia hardware device drivers 230 directly control a multimedia device such as an audio card 130 or video accelerator 124. For more information on the Media Control Interface layer 240, please see *Discover Windows 3.1 Multimedia* by Roger Jennings (Que Corp. 1992) chapters 23 and 24, which is hereby incorporated by reference. Please also see generally the *Microsoft Multimedia Programmer's Reference* and the *Microsoft Windows Multimedia Programmer's Workbook*, available from Microsoft Corporation, which are both hereby incorporated by reference.

The recording and presentation of multimedia displays is handled by the Windows Multimedia Extension Software in conjunction with the individual MCI drivers. Currently, not all multimedia drivers support MCI commands and command options. In particular, optional commands used by some devices are not supported. An example of an option command is "set," which sets the operating state of a device. Such a command would support the option "tempo 200," for example, as a means of controlling the speed of the playback device. Another example of an option command is the "pause" command, which suspends operation of a playback device, but leaves the device ready to resume playing immediately.

One embodiment of the present invention avoids use of MCI commands for querying the audio and video drivers and controlling the tempo and pausing of playback devices. In this embodiment the synchronization method of the present invention makes calls directly to the API of the audio and video drivers to obtain the necessary information and control the tempo of one of the respective data streams to maintain synchronization. The preferred embodiment of the invention uses the MCI interface to access the respective multimedia device drivers to query the drivers as well as adjust the tempo of the data streams. In alterative embodiments of the invention, the synchronization method uses MCI commands to interface to the audio driver and uses the direct API to access the video driver, or vice versa.

Multimedia storage devices can be classified as either simple devices or compound devices. Simple devices do not require a data file for playback, and videodisc players and CD audio players are examples of simple devices. Compound devices require a data file for playback and examples of compound devices include digital video players and waveform audio players. The preferred embodiment of the invention is used to synchronize audio and video data streams from compound devices.

Prior Art Multimedia System

Figure 3:
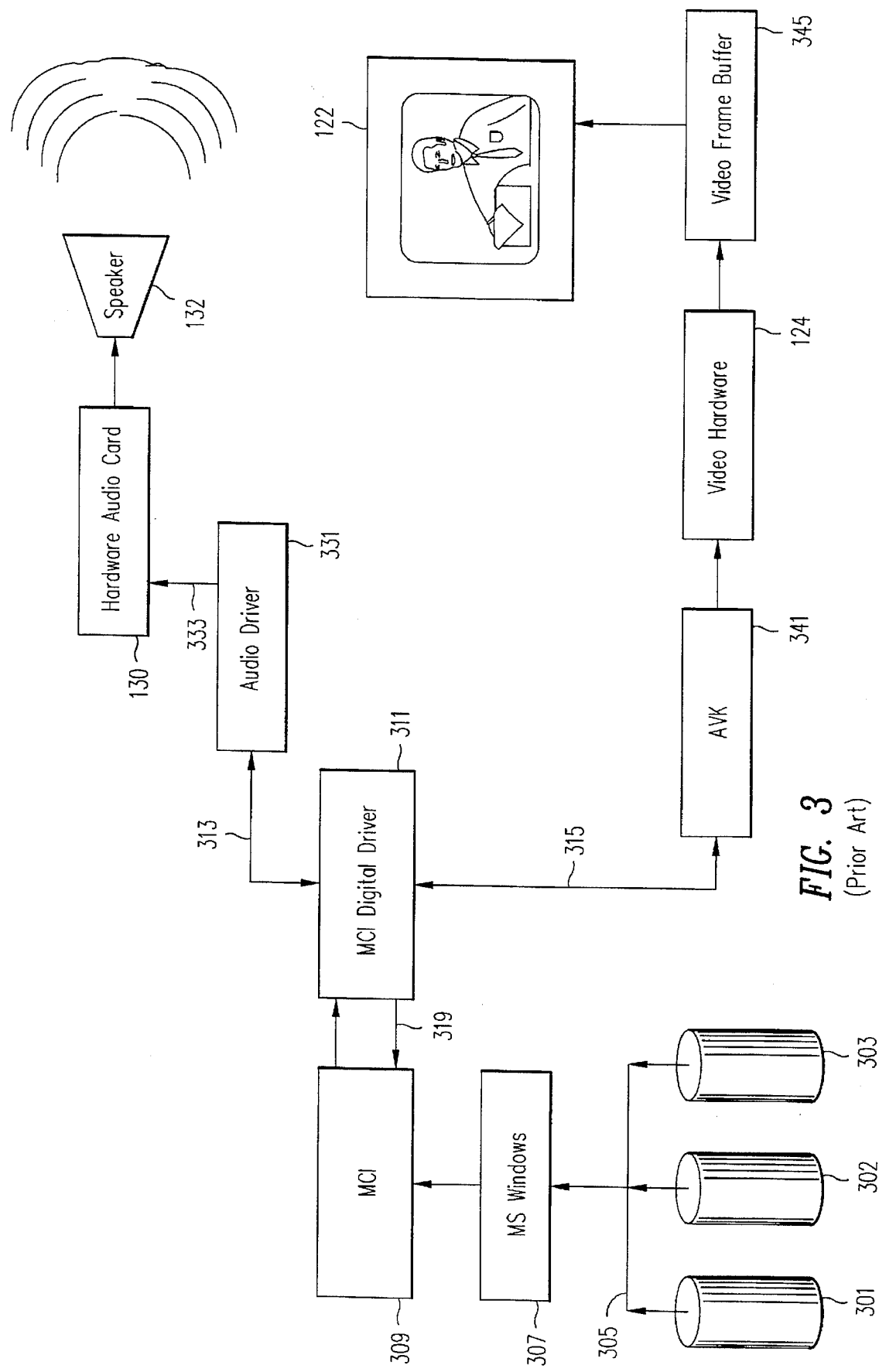
FIG. 3 is a block diagram illustrating a prior art multimedia software architecture.

Referring now to FIG. 3, a prior art multimedia system that does not include the synchronizing method of the present invention is shown. As shown in FIG. 3, audio and video data are stored in a multimedia system using one of a variety of storage devices 301, 302, and 303, including the hard disk 142 or CD-ROM 140. If the audio and video data are stored in the audio-video interleave (AVI) file format, then the audio and video data are interleaved together on the storage media in the same file. Alternatively, the audio and video data are stored on different storage media, perhaps on different computer systems connected via a network. As previously noted, the present invention operates regardless of whether the audio and video data are interleaved together, stored on separate media, or stored on separate computer systems.

The audio and video data are provided to the CPU 102, which is preferably executing the Microsoft Windows Operating System 307, as well as the Microsoft Multimedia Extension software. The Multimedia Extension software invokes the media control interface (MCI) layer software 309, which in turn invokes respective MCI digital drivers 311 to provide the respective data streams to the respective hardware subsystems. As shown, the MCI digital driver 311 communicates with the video driver in the Intel audio-video kernel (AVK) 341. The video driver in the AVK performs various processing on the video data and interfaces to video accelerator hardware 124, if any. The video driver in the AVK 341 also monitors the frame number of the video frame being played. The video data is then provided to the video frame buffer 345 in the video adaptor (VGA card) 120 where it is then displayed on the video monitor 122. The MCI digital driver 311 also communicates with the audio driver 331 to provide the audio data 313 to the respective hardware audio card 130 to the speaker 132. The audio driver 331 is preferably an MCI-compliant driver. Thus, audio data is read from the respective storage device and provided to the audio card 130 by the MCI driver 311 and the audio drivers 331 executing on the CPU 102. The audio driver 331 monitors the number of bytes of audio data processed from the start of a particular set of data.

As discussed in the background section, prior art multimedia systems provide generally unsynchronized audio and video outputs during a multimedia presentation due to the inherent difficulty of synchronizing separate audio and video data streams passing through separate audio and video subsystems and controlled by separate audio and video drivers. Numerous factors can affect the playback of the audio and video data streams, including the greater amount and more variable amount of processing required for the video data as well as other demands that can be made on the system.

As discussed above, a large amount of processing may be required before the video data can be displayed on the video monitor 122. For example, if the video's color depth is higher than the display's, as when an AVI file is played with 16-bit video on an 8-bit display, colors must be dithered to fit within the display's color restrictions. Also, if the playback window size differs from the resolution at which the video was captured, each frame must be scaled. Video and audio data processing can be adversely affected by a number of other factors, including a slow hard disk, a slow CD-ROM controller, and a slow display controller or audio card. During this process, it becomes virtually impossible for the environment to maintain the audio and video data properly synchronized while managing other critical tasks. As discussed in the background section, prior art methods, to the extent there are any, have proved inadequate in maintaining synchronization between video and audio data streams.

Figure 4:
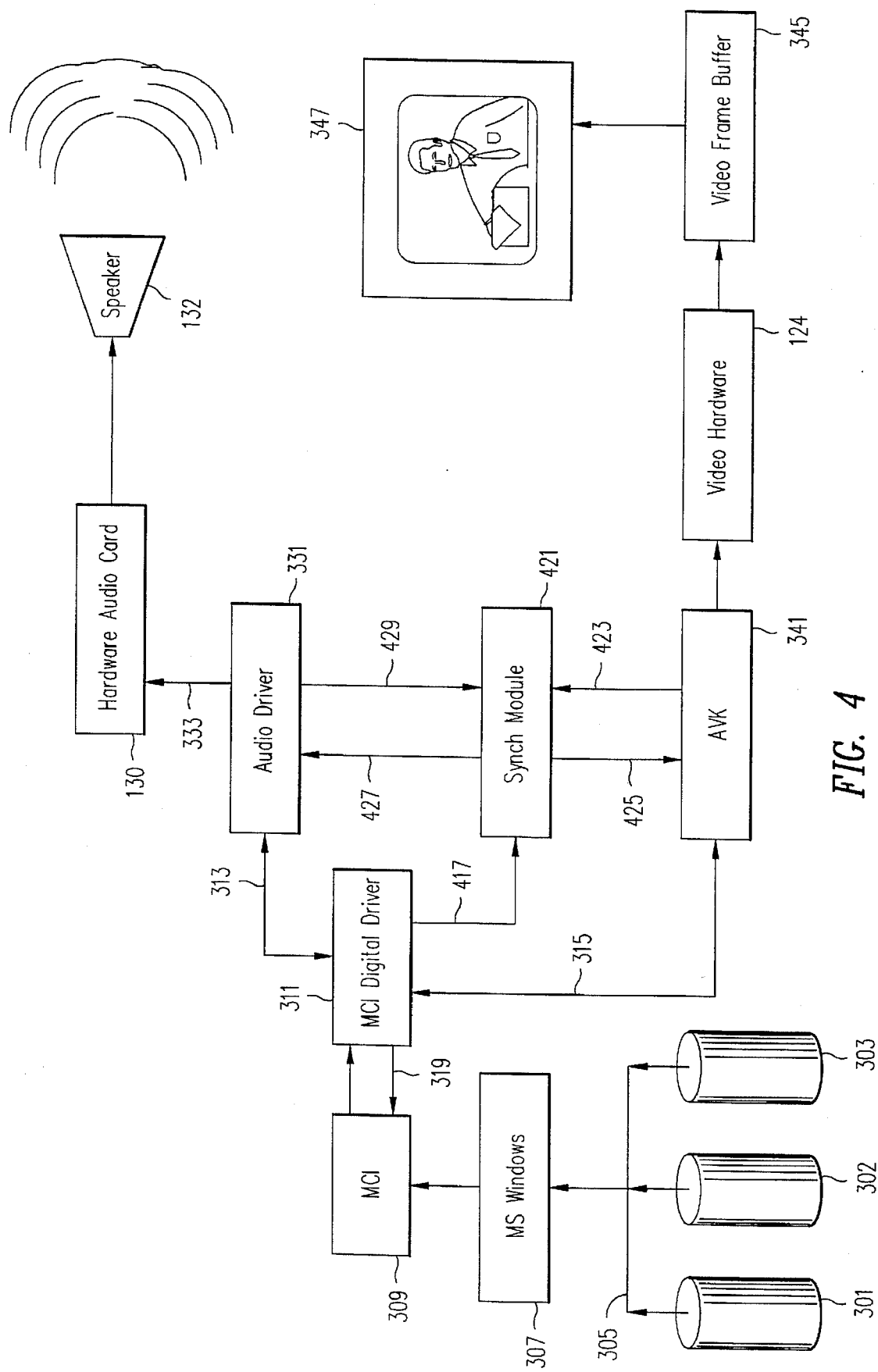
FIG. 4 is a block diagram illustrating a multimedia software architecture incorporating the synchronization method of the present invention.

Multimedia Software Architecture Including the Preferred Embodiment of the Present Invention Referring now to FIG. 4, operation of the preferred embodiment of the present invention is illustrated. Logical blocks in FIG. 4 that are similar to those shown in FIG. 3 are designated with the same reference numeral for convenience. As discussed above, the preferred embodiment uses an MCI compatible interface to perform the synchronization method of the present invention. The preferred embodiment also uses the video driver in the Intel Audio Video Kernel (AVK) 341. Because of the high level of device independence provided by the MCI interface, the multimedia capabilities of Microsoft Windows can be accessed through MCI protocols, rather than through low-level Application Program Interfaces (API). The preferred embodiment uses the MCI protocol and commands to interface with the video and audio drivers. These protocols are found in the *Microsoft Windows Software Development Kit, Multimedia Programmer's Guide*, Document Number PC30253-0492 which can be obtained from Microsoft Corporation of Redmond, Washington. (facsimile number 206-936-7329). In an alternative embodiment of the present invention, as mentioned above, the method of the present invention avoids the MCI layer and instead communicates directly with the API of the video and audio drivers. Bypassing the MCI interface layer results in a slight speed increase due to the decreased overhead. The source code listing following this description implements an embodiment of the invention that bypasses the MCI layer and instead communicates directly with the API of the audio and video drivers.

As shown in FIG. 4, video data and commands pass from the MCI digital driver 311 to the video driver in the AVK 341 via the data path 315. The AVK in turn provides data to the video hardware 124, if any, which in turn provides the video data to the video frame buffer 345 in the video adaptor 120.

Audio data and commands are transferred from the MCI digital driver 311 to the audio driver 331 via data path 313. The audio driver 331 in turn provides the data to the audio card 130 via data path 333, and the speaker 132 produces sound corresponding to the audio data.

The synchronization method of the present invention is performed by synchronization module block 421. The synchronization module 421 comprises a method that is preferably implemented in software, and a source code listing of one embodiment of this method is located at the end of this specification. As noted above, the source code listing at the end of this specification operates by interfacing directly to the API of the audio and video drivers rather than going through the MCI interface layer. Otherwise the source code listing is similar to the preferred method. The MCI digital driver 311 provides a signal to the synchronization module 421 over path 417. The computer system includes a timer which periodically interrupts the MCI layer 309 and MCI driver 311 and directs the MCI layer 309 to invoke the synchronization module 421 of the present invention. When the synchronization module 421 is invoked, the synchronization method queries the audio and video drivers 331 and 341 for the current position of the audio and video data. The synchronization module 421 is shown connected to the AVK video driver 341 and the audio driver 331. As noted above, the synchronization module 421 of the preferred embodiment of the invention interfaces to the AVK video driver 341 and the audio driver 331 through the MCI interface layer. In contrast, the source code listing at the end of this specification implements an embodiment that accesses the AVK video driver 341 and audio driver 331 directly via the API of the respective drivers.

The audio driver 331 provides audio position information to the synchronization module 421 over path 429. The AVK video driver 341 provides video frame position data over signal path 423 to the synchronization module 421. The synchronization module 421 uses the audio and video frame rate information to compute a video tempo value that is provided to the AVK video driver 341. Video tempo and pause commands are conveyed from the synchronization module to the AVK 341 over signal path 425, preferably routed through the MCI layer 309 as discussed above. Also, in the preferred embodiment, the synchronization module 421 provides a pause command to the audio driver 331. In an alternate embodiment, the present invention maintains synchronization by adjusting the audio tempo, and the synchronization module 421 generates an audio playback tempo command that is conveyed to the audio driver 331 over signal path 427.

Synchronization Method—Flowchart

Figure 5A:
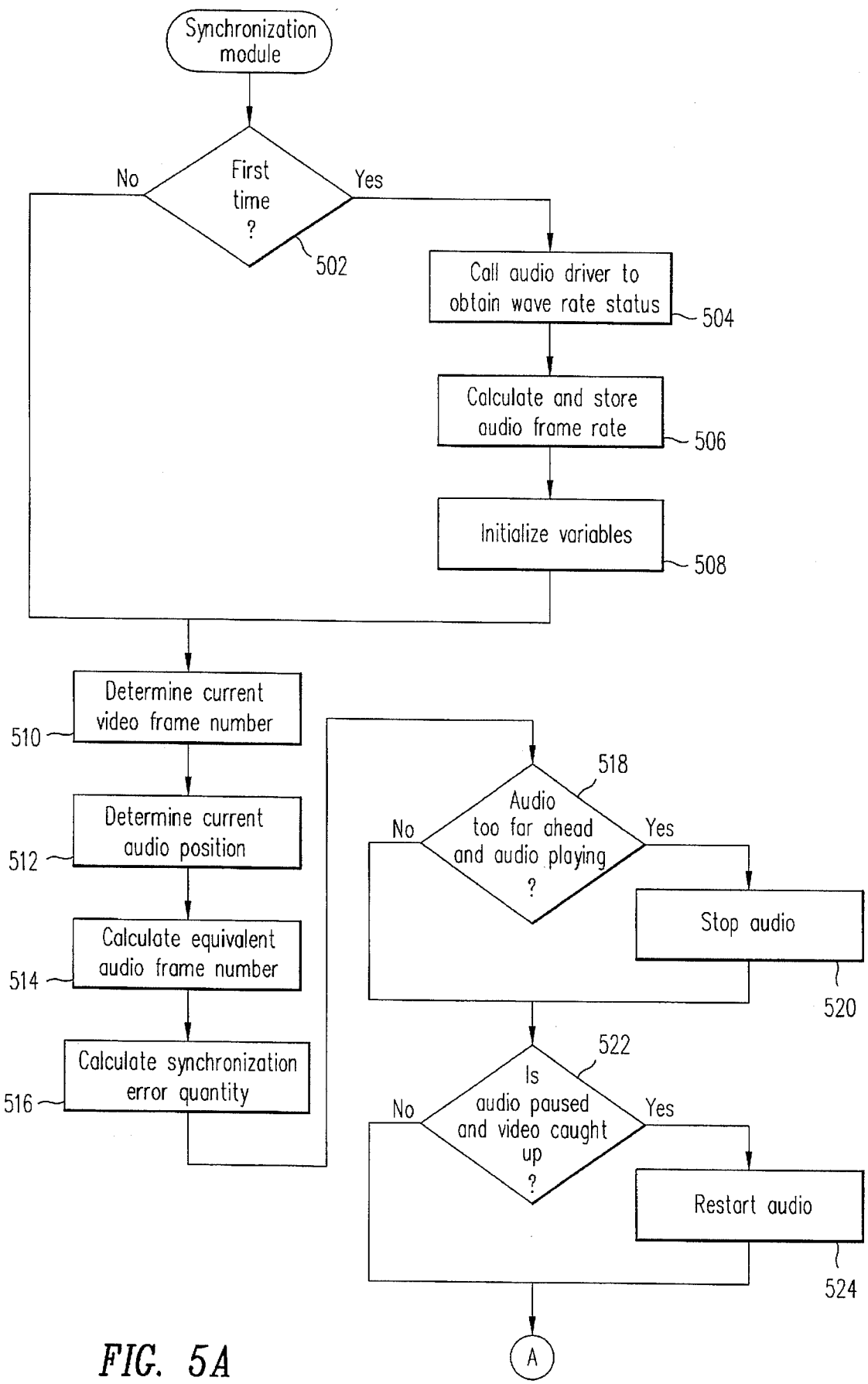
FIGS. 5A–B are flowchart diagrams illustrating operation of the synchronization method of the present invention.
Figure 5B:
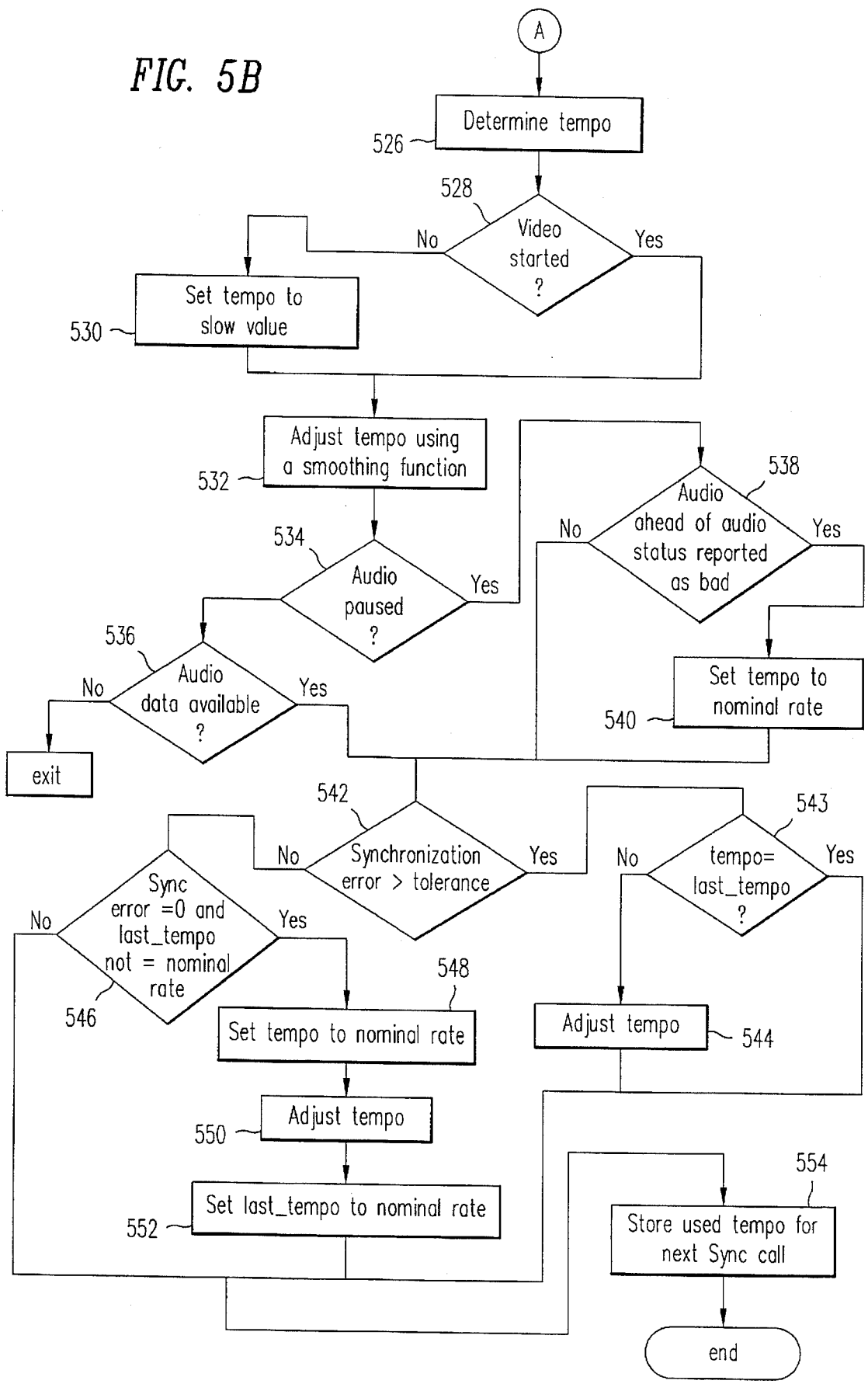

Referring now to FIGS. 5A and 5B, a flowchart diagram illustrating operation of the synchronization method performed by the synchronization module 421 according to the present invention is shown. The main portion of the synchronization method is located at lines 151–327 of the source code listing at the end of this specification. The synchronization method makes a function call to a function referred to as audframe_decupl_aud_dev, which computes the audio frame number from the audio position. This function is located generally at lines 1–150 of the source code listing.

When the synchronization method is invoked, in step 502 the method determines if this is the first time the method has been invoked. If so, then in step 504 the method calls the audio driver to obtain the wave rate, i.e., how many kilohertz at which the audio is operating. In step 506 the method calculates and stores the number of bytes that are in an audio frame that is equivalent to a corresponding video frame. The method obtains the wave rate at which the audio is playing, determines how many bytes of audio are played each second, then calculates the equivalent number of bytes for each video frame using the known video frame rate. The equation used in this calculation is:

$$bytes\_per\_frm_x 100000 = Avio \rightarrow AudStrms[0].SamplesPerSecond * Avio \rightarrow AudStrms[0].FrameRate/10\ UL;$$

In step 508 the synchronization method initializes other variables. For example, the method initializes a previous tempo variable to a starting value, preferably a nominal value. As discussed further below, this previous tempo variable is used to record the prior tempo variable provided to the video driver the last time the synchronization module was invoked. Other variables can be initialized as desired. If the synchronization module is not being called for the first time in step 502, then operation proceeds directly to step 510.

It is noted that the preferred embodiment of the invention operates as shown in FIG. 5A in steps 502–508. However, in an alternate embodiment, steps 502–508 are performed elsewhere, such as in the audio driver 331 or the MCI layer 309. It is also noted that steps 502–508 are not included in the source code listing at the end of this specification.

In step 510 the method determines the current video frame number. The synchronization method of the present invention calls the respective video driver 341 controlling the video hardware (if any) to determine what video frame number is currently being played. This call preferably uses MCI interface commands. In step 512 the method calls the respective audio driver to determine the current audio position, i.e., which audio byte is currently being played. This call also preferably utilizes MCI commands. In an alternate embodiment, the call to the video driver is made directly to the API of the video driver, and the call to the audio driver involves a call directly to the API of the .WAV audio driver 331 to determine what audio byte is currently being played. In step 514 the method then calculates the equivalent audio frame number being played using the audio frame rate value calculated and stored in step 506. As shown in the source code listing at the end of this specification, step 514 invokes a function referred to as audframe_decupl_aud_dev. This function calculates the current audio frame number using a fraction representing the number of bytes per equivalent audio frame to determine the audio frame number. This function preferably does not use floating point numbers in the calculation due to the perceived unreliability of floating point numbers in some programming environments.

Figure 6:
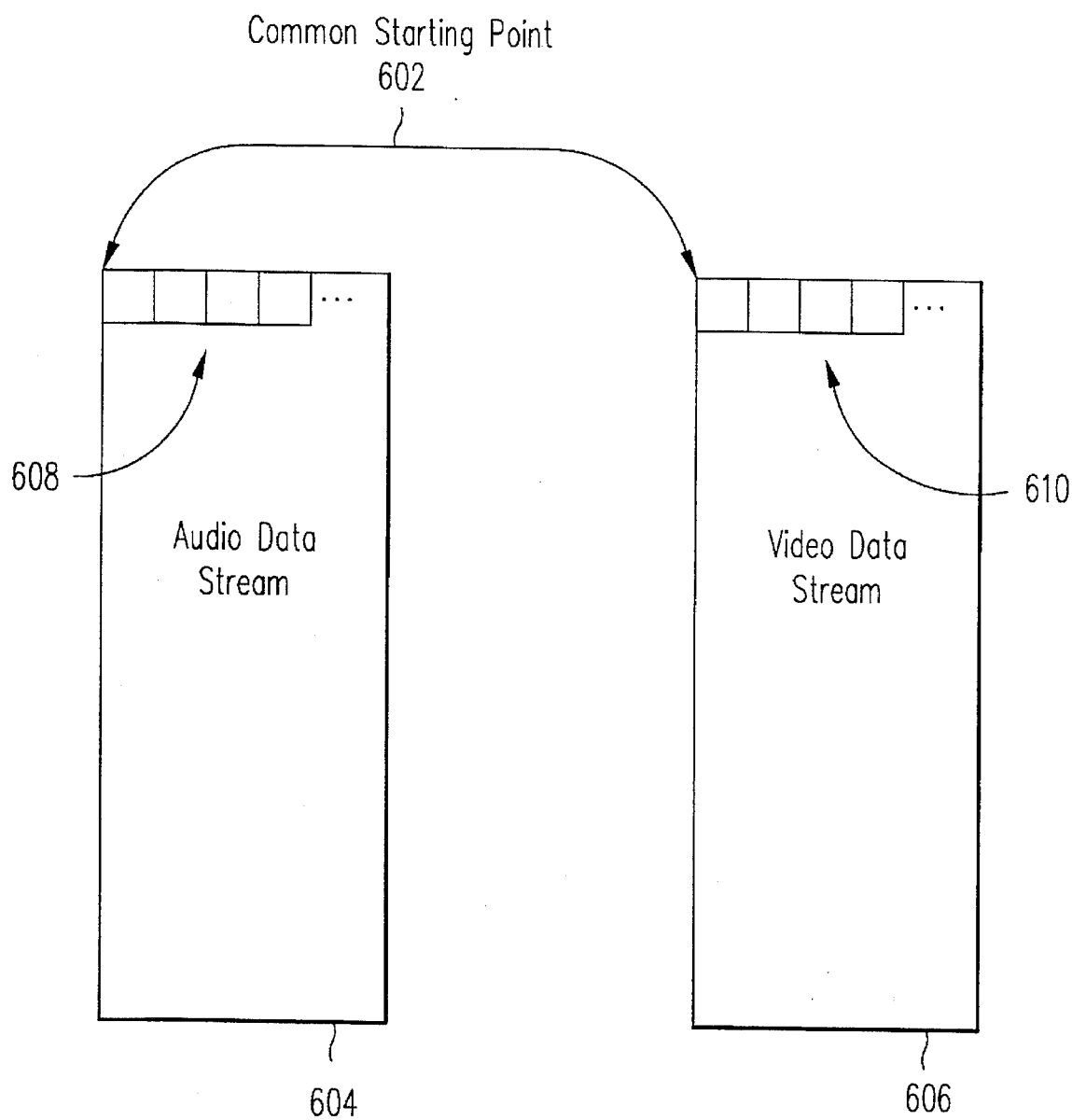
FIG. 6 illustrates audio and video data streams having a common starting point.

Referring to FIGS. 5A and 5B and 6, the preferred embodiment of the present invention requires that there be a common starting point for the audio and video data. FIG. 6 illustrates an audio data stream 604 and a video data stream 606 having a common starting point 602. Each audio data stream 604 includes audio frames 608 having audio data, and each video data stream 606 includes video frames 610 having video data. There is a time index of zero where the audio data stream 604 and video data stream 606 are both in synchrony, such that a first byte of the audio data stream 604 and a first byte of the video data stream 606 are generated simultaneously.

In step 516 the method then calculates the synchronization error quantity. Clearly, because audio data stream 604 and video data stream 606 have a common starting point 602, calculating the synchronization error quantity essentially involves subtracting the current video frame number from the current audio frame number to determine the number of frames by which the audio and video are out of sync.

In step 518 the method determines if the audio is too far ahead of the video and if the audio is still playing. In the preferred embodiment the method determines if the audio is more than 5 frames ahead of the video in step 518. If the audio is determined to be too far ahead and is also playing in step 518, then the method stops the audio in step 520 and then advances to step 522. If the audio is either not too far ahead, i.e., not more than 5 frames ahead, or the audio is not playing, then operation advances directly to step 522. It is noted that if the audio is determined to be too far ahead in step 518, i.e. more than 5 frames ahead of the video, then the synchronization method of the present invention may not be working, i.e., the video tempo is not being set properly. Another possibility is that the synchronization method is not being called often enough. It is noted that if the video advances too far ahead of the audio, then the video is simply slowed down using a lower video tempo.

In step 522 the method determines if the audio is paused and the video has caught up to the audio. In the preferred embodiment, the video is considered to have caught up to the audio if the audio is less than 2 frames ahead of the video. If the audio is paused and the video is determined to have caught up to the audio, then the audio is restarted in step 524. Operation then advances to step 526 (FIG. 5B). If either the audio is not paused or the video has not caught up to the audio, then operation proceeds directly to step 526.

In step 526 the method selects a synchronization adjustment factor, referred to as a tempo value, for the video driver using a lookup table. In the source code listing at the end of this specification, the video tempo value is actually selected from a case statement. As noted above, in the preferred embodiment the synchronization method adjusts the video frame rate or video tempo to maintain the audio and video data streams in sync. However, it is noted that in the present invention either the audio or video stream rates can be adjusted as desired. For example, the method could slow down or speed up the video frame rate or slow down or speed up the audio frame rate as desired to maintain the respective audio and video data streams in sync. It is noted that adjusting the audio data stream may be a simpler procedure than adjusting the video data stream. The audio data stream was not adjusted in the preferred embodiment because of concerns that the user might be able to hear the audio adjustments. However, experimentation has shown that adjustments to the audio data stream would generally not be detectable by the user if the synchronization method of the present invention was invoked a sufficient number of times each second.

In step 528 the method determines if the video has started to play. If not, then the method sets the video tempo value to a slow value. This is done merely to begin the video portion of the presentation at a slow rate. If the video has started to play, operation proceeds directly to step 532. In step 532 the method adjusts the video tempo value using a smoothing or dampening function. The preferred embodiment uses a smoothing formula which combines one half of the current tempo value plus one half of the previous tempo value. This smoothing function operates to prevent overcompensation and to add stability to the synchronization method, thus allowing for smoother synchronization. The adjustment performed in step 532 is similar to a damping function.

In step 534 the method determines if the audio is paused. If the audio is determined to not be paused in step 534, then in step 536 the method determines if audio data is available. If audio data is determined to not be available in step 536, then it is assumed that the multimedia presentation does not include any audio data. In this case the method exits since it not necessary to adjust the video playback speed or tempo if there is no audio component. If audio data is determined to be available in step 536, then operation advances to step 542.

If the audio is determined to be paused in step 534, then in step 538 the method determines if the audio is ahead of the video or if the audio status is reported as bad. If the audio is determined to be equal to or behind the video in step 538, then operation advances to step 542. If the audio is determined to be ahead of the video in step 538 or if the audio status is reported as bad, then the method sets the video tempo to a nominal rate, i.e., a rate which is calculated to be equal to the average speed of the audio playback. The video tempo is set to the nominal rate in step 540 because it is not necessary to set the video rate to large (fast) tempos if the audio is paused and the audio is ahead of the video. In cases where the audio is paused and is ahead of the video, this typically means that the user has either clicked on the PAUSE or STEP button during the presentation, or that the audio has been halted because the audio and video were too far out of sync.

In step 542 the method determines if the synchronization error calculated in step 516 is greater than a set tolerance. In the preferred embodiment the tolerance is set to 1 frame. Thus the synchronization method does not adjust the video tempo unless the audio and video are at least a certain amount out of sync. If the audio and video are in sync or are relatively close to being in sync, then the tempo is not adjusted. This avoids having to call the video driver to adjust the tempo and thus reduces the overhead caused by synchronization. If the synchronization error is greater than the tolerance in step 542, then in step 543 the method determines if the tempo value is equivalent to the last_tempo value, i.e., the tempo value sent to the video driver the last time the synchronization method was executed. If the current tempo value equals the last_tempo value, then operation advances to step 554. In this instance the video driver is already operating at this tempo, and thus there is no need to call the video driver to set the tempo value to the same value. This also serves to reduce the overhead of the synchronization method. If the tempo value does not equal the last_tempo value in step 543, then in step 544 the method adjusts the video frame rate using the tempo value determined in step 526 and adjusted in step 532. As noted above the method preferably adjusts the video frame rate using MCI interface calls. In an alternate embodiment, as shown in the source code listing, the synchronization method passes the video frame rate or tempo value directly to the video driver, using the AvkGrpTempo function call. The video driver uses the received number to adjust the video frame rate. Operation then advances to step 554.

If the synchronization error is determined to not be greater than the tolerance in step 542, then in step 546 the method determines if the synchronization error is 0 and if the previous tempo was not set to the nominal rate. If either the synchronization error is not 0 or the previous tempo was set to the nominal rate, then operation advances to step 554. In this instance it is not necessary to adjust the tempo because the synchronization error was determined to be less than the tolerance in step 542. If the synchronization error is 0 and the last tempo is not equal to the nominal rate, then an extra stabilizing effect is added. This extra stabilizing effect is referred to as a "lock-down" function. In step 548 the method sets the tempo to the nominal rate and in step 550 the method adjusts the video frame rate by making the appropriate MCI interface call to the video driver. In step 552 the method sets the last_tempo variable to the nominal rate to prevent steps 548–552 from being performed the next time the synchronization method is called.

As noted above, steps 548–552 are performed when the synchronization error is 0 but the prior tempo was not set to the nominal rate. Here it is desirable to eliminate the effects of the smoothing function applied in step 532. If the audio and video data streams are in sync, the tempo value produced by the smoothing function in step 532 will suggest that the two streams are out of sync because part of the tempo value calculation is the weighted average of the previous tempo value with the current value. Thus, if the current tempo value is zero, but a previous adjustment was required, the synchronization method would report that a tempo adjustment is necessary. Therefore, in this instance the tempo is set to the nominal rate just as if the smoothing function had not been applied.

Thus, this lock-down function ensures that the synchronization method does not overcompensate when the audio and video are in sync. In other words, this function adds stability by locking on a point where the audio and video are in sync to prevent overcompensation from occurring, i.e., primarily to prevent the smoothing function applied in step 532 from pushing the audio and video out of sync. Without this lock-down function, if the audio and video data streams were in sync, the smoothing function would cause the streams to fall out of sync, i.e., would cause the video data stream to oscillate between being ahead of or behind the audio stream.

In step 554 the method saves the tempo value for the next call by the periodic timer. The synchronization method then completes.

Conclusion

Therefore, a method and apparatus for synchronizing the audio and video portions of a multimedia display is shown. This method provides superior synchronization over methods found in the prior art.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for synchronizing audio and video data streams having a common starting point during a multimedia presentation, comprising the steps of:

determining a current position of the video data stream relative to the common starting point;

determining a current position of the audio data stream relative to the common starting point;

calculating a synchronization error related to a difference between the respective video data stream and audio data stream current positions using the current positions of the audio and video data streams;

adjusting a tempo of one of the data streams based on the synchronization error if necessary to place the audio and video data streams in synchrony;

repeating the determining steps and the steps of calculating and adjusting during the multimedia presentation to maintain the audio and video data streams in synchrony.

2. The method of claim 1, further comprising:

determining if the synchronization error is greater than a tolerance value after the step of calculating and prior to the step of adjusting, and wherein the step of adjusting the tempo is performed only if the synchronization error is greater than the tolerance value.

3. The method of claim 1, further comprising:

determining a tempo value from the synchronization error calculated in the step of calculating prior to the step of adjusting; and wherein the step of adjusting comprises adjusting the tempo of one of the data streams using the determined tempo value.

4. The method of claim 3, further comprising:

storing the determined tempo value;

calculating a second synchronization error by repeating at a subsequent time the steps of determining a current position of the video data stream, determining a current position of the audio data stream, and calculating a synchronization error;

determining a second tempo value from the second synchronization error; and repeating the step of adjusting based on the second synchronization error if the second determined tempo value does not equal the stored determined tempo value.

5. The method of claim 4, further comprising:

applying a smoothing function to the second determined tempo value using the stored determined tempo value and second determined tempo value prior to the step of adjusting, wherein the smoothing function prevents overcompensating the tempo adjustment and adds stability to the synchronizing method.

6. The method of claim 5, further comprising:

determining if the synchronization error is 0 and if the immediately prior tempo value was not equal to a nominal rate prior to the step of adjusting; and wherein the step of adjusting the tempo comprises setting the tempo to the nominal rate if the synchronization error is 0 and the immediately prior tempo value was not equal to a nominal rate.

7. The method of claim 1, wherein the step of adjusting the tempo comprises adjusting the tempo of the video data stream.

8. The method of claim 1, wherein the step of adjusting the tempo comprises adjusting the tempo of the audio data stream.

9. The method of claim 1, further comprising:

determining if the audio data stream is far ahead of the video data stream and if the audio is playing after the steps of determining respective current positions; and halting playback of the audio data steam if the audio data steam is far ahead of the video data steam and the audio is playing.

10. The method of claim 9, further comprising:

determining if the audio playback is paused and if the video data stream has approximately caught up to the audio data stream; and restarting the audio playback if the audio playback is paused and the video data stream has approximately caught up to the audio data stream.

11. The method of claim 1, wherein the video data stream is processed in a video subsystem and the audio data stream is processed in an audio subsystem such that the video data stream is decoupled from the audio data stream.

12. The method of claim 13, wherein each video frame has a video frame number relative to the common starting point, wherein the step of determining the current position of the video data stream comprises determining a current video frame number being played.

13. The method of claim 1, wherein at any point in time during the multimedia presentation an audio frame and a video frame are being played and the step of determining the current position of the audio data stream includes the steps of:

determining which audio byte is currently being played;

obtaining a frequency at which the audio is being played;

determining how many bytes of audio are being played per unit of time;

determining a number of bytes per audio frame equivalent to a number of bytes per video frame: and determining an equivalent audio frame number being played relative to the common starting point.

14. The method of claim 12, wherein the step of calculating a synchronization error comprises calculating a difference between the current video frame number and the determined equivalent audio frame number.

15. The method of claim 1, wherein the synchronizing method is periodically performed each time after the expiration of a predetermined time interval.

16. A computer system which synchronizes audio and video data streams, having respective audio and video data, during an audio-visual display, comprising: one or more storage devices for storing the audio and video data for the audio-visual display;

a video monitor coupled to the one or more storage devices for generating a video display corresponding to the video data in the video data stream;

a speaker coupled to one or more storage devices for generating sounds corresponding to the audio data in the audio data stream;

one or more data paths for transmitting the audio and video data streams corresponding to the audio and video data from the one or more storage devices to the speaker and the video monitor, respectively;

means coupled to the one or more storage devices, the one or more data paths, the video monitor and the speaker for obtaining a current position of the video data stream relative to a common starting point of the audio and video data streams;

means coupled to the one or more storage devices, the one or more data paths, the video monitor and the speaker for obtaining a current position of the audio data stream relative to the common starting point;

means coupled to both the means for obtaining for calculating a synchronization error related to a difference between the respective video data stream and audio data stream current positions using the current positions of the audio and video data streams; and means coupled to the one or more data paths and the synchronization error calculating means for adjusting a tempo of one of the data streams based on the synchronization error if necessary to place the audio and video data streams in synchrony; and wherein the means for obtaining, means for calculating, and means for adjusting repeat their respective functions during the audio-visual display to maintain the audio and video data streams in synchrony.

17. The computer system of claim 16, further comprising:

means coupled to the calculating means for determining if the synchronization error is greater than a tolerance value;

wherein the means for adjusting the tempo adjusts the tempo only if the synchronization error is greater than the tolerance value.

18. The computer system of claim 16, further comprising:

means for determining a tempo value from the synchronization error calculated by the means for calculating;

wherein the means for adjusting adjusts the tempo of one of the data streams using the determined tempo value.

19. The computer system of claim 18, further comprising:

means coupled to the tempo value determining means for storing the determined tempo value, wherein the stored determined tempo value is used as a prior tempo value the next time the synchronizing method is performed;

means coupled to the tempo value determining means and the storing means for determining if the determined tempo value equals the prior tempo value;

wherein the means for adjusting is not executed if the determined tempo value equals the prior tempo value.

20. The computer system of claim 18, further comprising:

means coupled to the tempo value determining means for storing the determined tempo value;

means coupled to the tempo value determining means and the storing means for applying a smoothing function to the determined tempo value using a tempo value stored by the means for storing, wherein the smoothing function prevents the means for adjusting the tempo from overcompensating the tempo adjustment and adds stability to the tempo adjustment.

21. The computer system of claim 20, further comprising:

means coupled to the calculating means for determining if the synchronization error is 0 and if the immediately prior tempo value was not equal to a nominal rate; and wherein the means for adjusting the tempo comprises means for setting the tempo to the nominal rate if the synchronization error is 0 and the immediately prior tempo value was not equal to a nominal rate.

22. The computer system of claim 16, wherein the means for adjusting the tempo adjusts the tempo of the video data stream.

23. The computer system of claim 16, wherein the means for adjusting the tempo adjusts the tempo of the audio data stream.

24. The computer system of claim 16, further comprising:

means coupled to the one or more data paths for determining if the audio data stream is far ahead of the video data stream and if the audio is playing; and means for halting playback of the audio data stream is the audio data stream is far ahead of the video data stream and the audio is playing.

25. The computer system of claim 24, further comprising:

means coupled to one or more data paths for determining if the audio playback is paused and if the video data stream has approximately caught up to the audio data stream;

means coupled to the one or more data paths for restarting the audio playback if the audio playback is paused and the video data stream has approximately caught up to the audio data stream.

26. The computer system of claim 16, wherein the one or more data paths comprises an audio data path for transmitting the audio data stream and a video data path for transmitting the video data stream.

27. The computer system of claim 28, wherein the means for obtaining the current position of the video data stream comprises means for obtaining a current video frame number.

28. The computer system of claim 16, wherein the audio data stream and the video data stream include audio frames and video frames, respectively, each audio and video frame includes a respective frame number relative to the common starting point, the means for obtaining the current position of the audio data stream further comprising:

a means for determining which audio byte is currently being played;

wherein said means for obtaining the current position of the audio data stream includes means for calculating an equivalent audio frame number relative to the common starting point using the audio byte currently being played, an audio play frequency, using a number of bytes of audio played per unit of time, and using a number of bytes per audio frame equivalent to a number of bytes per video frame.

29. The method of claim 27, wherein the means for calculating a synchronization error calculates a difference between the current video frame number and the calculated equivalent audio frame number.

30. The method as in claim 1 wherein the common starting point is a time index of zero where the audio and video data streams are both in synchrony, such that a first byte of audio data and a first byte of video data are generated simultaneously.

31. The method as in claim 1 wherein the multimedia presentation utilizes a computer system having a video driver, and wherein the video data stream includes video frames, and wherein the video data stream current position determining step comprises querying the video driver to determine a current video frame number being played, the method further comprising:

determining a tempo value using the synchronization error;

wherein the tempo adjusting step comprises passing the tempo value to the video driver.

32. The method as in claim 1 wherein the multimedia presentation utilizes a computer system having an audio driver and the audio data stream current position determining step comprises the step of:

querying the audio driver to determine the current audio data stream position.

33. The method as in claim 1 wherein the video data stream and the audio data stream are respectively free from time stamps, and the video data stream is free from any timing information relative to the audio and video data stream correspondence.

34. The method as in claim 1 wherein the tempo is a rate of one of the data streams.

35. The method as in claim 5 wherein the smoothing function combines one half of a current tempo value plus one half of the prior tempo value.

36. The computer system as in claim 16 wherein the current position of the video data stream is represented by a video frame number, the computer system further comprising:

a video driver means, coupled to the means for obtaining a current position of the video data stream, for passing the video frame number to the means for obtaining a current position of the video data stream.

37. The computer system as in claim 16 wherein the current position of the audio data stream is represented by an audio frame number, the computer system further comprising:

an audio driver means, coupled to the means for obtaining a current position of the audio data stream, for passing the audio frame number to the means for obtaining a current position of the audio data stream.

38. The computer system as in claim 16 wherein the common starting point is a time at which a first byte of the audio data and a first byte of the video data are in synchrony.

39. The computer system as in claim 16 wherein the tempo is a rate of one of the data streams.

40. The computer system as in claim 20 wherein the smoothing function combines one half of a current tempo value plus one half of the prior tempo value.

* * * * *